United States Patent
Bozchalui et al.

(10) Patent No.: US 9,201,411 B2
(45) Date of Patent: Dec. 1, 2015

(54) OPTIMAL ENERGY MANAGEMENT OF A MICROGRID SYSTEM USING MULTI-OBJECTIVE OPTIMIZATION

(71) Applicants: Mohammad Chehreghani Bozchalui, Cupertino, CA (US); Ratnesh Sharma, Fremont, CA (US)

(72) Inventors: Mohammad Chehreghani Bozchalui, Cupertino, CA (US); Ratnesh Sharma, Fremont, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 714 days.

(21) Appl. No.: 13/646,645

(22) Filed: Oct. 5, 2012

(65) Prior Publication Data
US 2013/0166043 A1 Jun. 27, 2013

Related U.S. Application Data

(63) Continuation-in-part of application No. 13/543,820, filed on Jul. 7, 2012, now Pat. No. 9,146,547.

(60) Provisional application No. 61/565,201, filed on Nov. 30, 2011.

(51) Int. Cl.
 *G05B 13/04* (2006.01)
 *G05B 17/02* (2006.01)
(52) U.S. Cl.
 CPC ............... *G05B 13/04* (2013.01); *G05B 17/02* (2013.01)
(58) Field of Classification Search
 CPC ................................. G05B 13/04; G05B 17/02
 USPC ................................................. 700/290
 See application file for complete search history.

(56) References Cited

U.S. PATENT DOCUMENTS

2004/0267408 A1* 12/2004 Kramer ................... 700/291
2010/0235025 A1* 9/2010 Richter et al. ............ 701/22

OTHER PUBLICATIONS

"Optimal design of distributed CCHP system" by Ye et al. dated Dec. 16-18, 2011.*
Asano, Methodology to Design the Capacity of a Microgrid, IEEE 2007.
Farag, Economic Load Dispatch Multiobjective Optimization Procedures Using Linear Programming Techniques, IEEE Transactions on Power Systems, vol. 10, No. 2, May 1995.
Li, Optimization and Analysis of Operation Strategies for Combined Cooling, Heating and Power System, IEEE 2011.
Marnay, Optimal Technology Selection and Operation of Commercial-Building Microgrids, IEEE Transactions on Power Systems, vol. 23, No. 3, Aug. 2008.
Mohamed, Power Management Strategy for Solving Power Dispatch Problems in MicroGrid for Residential Applications, 2010 IEEE International Energy Conference.
Mohammed, System Modelling and Online Optimal Management of MicroGrid Using Multiobjective Optimization, IEEE 2007.
Talaq, A Summary of Environmental/Economic Dispatch Algorithms, IEEE Transactions on Power Systems, vol. 9, No. 3, Aug. 1994.
Zhang, Optimal Energy Management of Hybrid Power System with Two-Scale Dynamic Programming, IEEE 2011.

\* cited by examiner

*Primary Examiner* — Mohammad Ali
*Assistant Examiner* — Ziaul Karim
(74) *Attorney, Agent, or Firm* — Joseph Kolodka

(57) ABSTRACT

Systems and methods are disclosed to improve energy efficiency of a farm with livestock wastes by generating a cooling, heating, and power (CCHP) microgrid model; performing on a computer a multi-objective optimization to improve system efficiency of energy utilization and reduce environmental problems caused by animal wastes; and displaying results of the optimization for review.

19 Claims, 4 Drawing Sheets

OPTIMAL ENERGY MANAGEMENT OF A MICROGRID SYSTEM USING MULTI-OBJECTIVE OPTIMIZATION

The present application is a Continuation-In-Part of U.S. application Ser. No. 13/543,820 filed Jul. 7, 2012, which in turn claims priority to Provisional Application Ser. No. 61/565,201 filed Nov. 30, 2011, the content of which is incorporated by reference.

BACKGROUND

Energy management of a resilient and sustainable power infrastructure for a remote area is challenging. For example, environmental and economic considerations make it less feasible today for the construction of long distance transmission lines to remote areas with few as well as sparse population, which will drive up the cost of electricity supply and delivery. Large livestock farms or dairy farms are usually located far away from urban areas and sometimes the electricity supply can be a problem. Additionally, these farms may cause environmental problems brought by the inappropriate treatment of animal waste in these farms. The aggregated piled up animal waste seriously deteriorates the surrounding environment, especially for the air condition. The foul odor sometimes can be smelled miles away along the freeway, where a dairy farm is usually located nearby. Anaerobic digestion is an effective way of dealing with animal waste in these farms, which can protect the environment by consuming animal waste and the produced biogas energy is renewable.

An emerging technical solution to counter the above mentioned problems is the microgrid, which is a regional electric power distribution network consisting of DERs and local loads. Microgrid can:

improve the utility system performance through combined heat and power (CHP), and increasing of the overall transmission utilization, provide back-up power and premium power, make use of renewable energy such as biogas, PV and wind, and reduce greenhouse gas emissions.

Management and operation of microgrid is complex and many issues should be considered. The basic microgrid architecture may consist of a collection of distributed generation, storage and load assets connected through a system of feeders controlled as a single entity. These entities can be connected to the grid or isolated from the grid based on IEEE 1547 or other applicable standards. Selection and sizing of distributed generation assets (DER) is based on operational characteristics, efficiency, initial cost, and onsite conditions. When a microgrid operates in grid connected mode, the local load receives real/reactive power either from the grid or from local DERs or from both, depending on the customer's situation; when the microgrid switches to stand-alone operation, the power supply, and the load should be the same to clear the power mismatch condition and regulate voltage magnitude and frequency of the islanded system. Microturbines and fuel cells are inertia-less and the response time to control signal is relatively slow; thus, the storage, like batteries or supercapacitors, should be necessarily considered to ensure initial energy balance. Management of grid-tied and islanded system should consider the cost of startup/shutdown and efficiency curves of all generation and storage systems in addition to normal maintenance and fuel costs. Energy arbitrage is another consideration depending on the power purchase agreement between the utility and the microgrid operator.

SUMMARY

Systems and methods are disclosed to improve energy efficiency of a farm with livestock wastes by generating a cooling, heating, and power (CCHP) microgrid model; performing on a computer a multi-objective optimization to improve system efficiency of energy utilization and reduce environmental problems caused by animal wastes; and displaying results of the optimization for review.

Implementations of the above aspect can include one or more of the following. The optimization method incorporates an explicit daily operating cost minimization criterion applied to the microgrid infrastructure as well as daily energy output maximization from DERs. The system balances tradeoff relationship between daily operating cost minimization and daily DERs energy output maximization. The system provides optimal management of a rural microgrid infrastructure based on multi-objective optimization. This objective is achieved through the creation of a comprehensive CCHP rural microgrid model. The whole microgrid system is grid-connected and the CCHP part is dependent on the electrical part. The whole system model is mathematically programmed into the platform of GAMS. But it can be done in any platform using any programming language and an algebraic equation solver Advantages of the system may include one or more of the following. The system helps but not limited to electrification of rural and remote areas. The system reduces environmental from large livestock farms such as dairy farms through proper treatment of animal wastes. The system enhances electrical system in farms vis-a-vis efficient waste management. The optimization models developed and presented in this work are novel formulations of operation characteristics of various components of an energy system that can be used to optimally operate microgrids. The presented method is applied to a realistic commercial building microgrid to find the best strategies to operate the microgrid considering costs and emission reductions targets. Simulation results show the effectiveness of the proposed model to reduce GHG emissions, improve energy system efficiency, and minimize daily costs of a commercial building microgrid according to DOE's 2020 targets for microgrids.

DESCRIPTION

Figure 1:
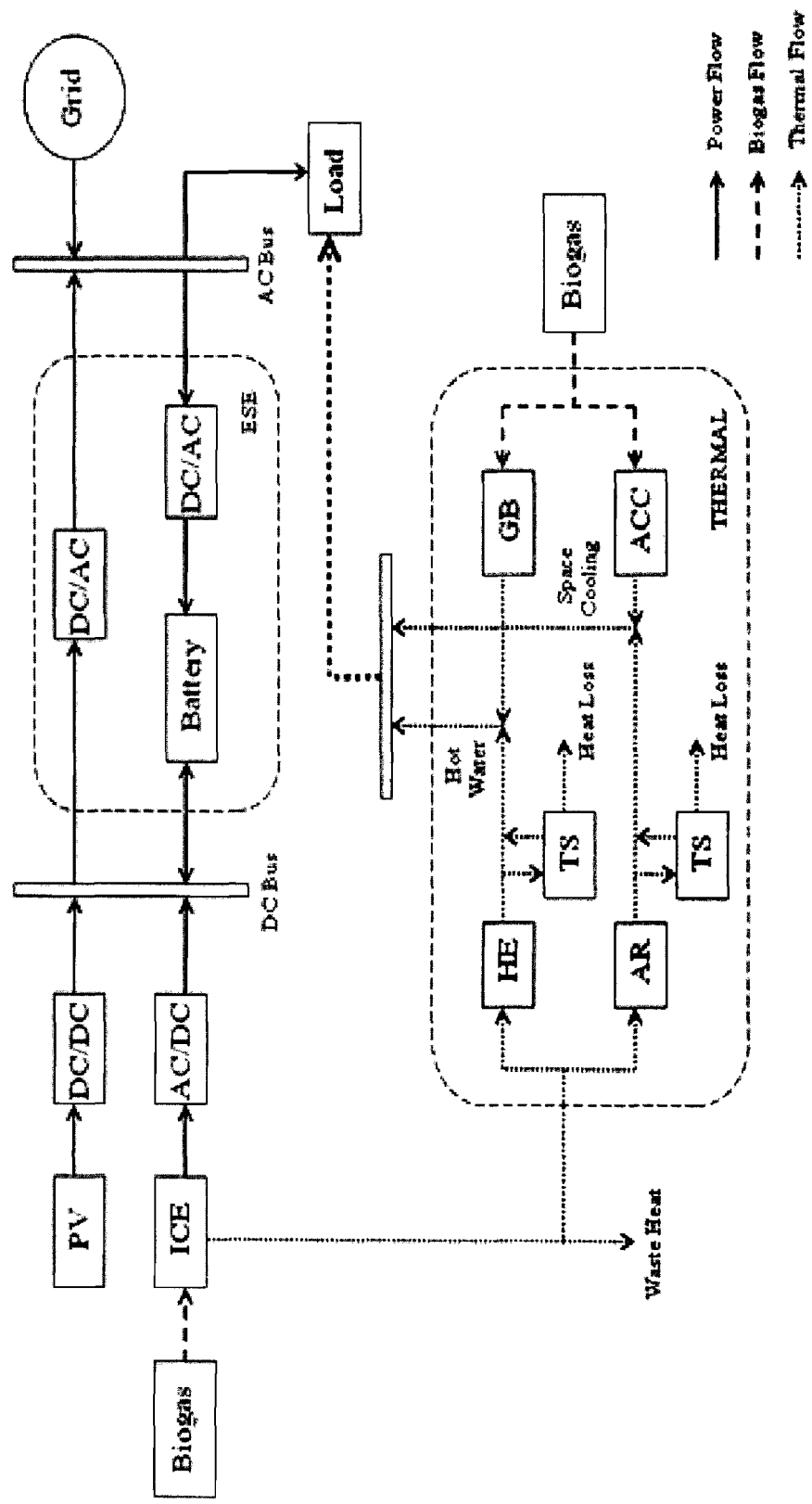
FIG. 1 shows an exemplary microgrid system.

FIG. 1 shows an exemplary microgrid system. The produced biogas is used to fire ICEs, gas boiler, as well as absorption chiller for cooling. The whole system can be divided into two parts: electrical part and thermal part. In electrical part, PV and ICEs are used as DERs to provide electricity for the whole system, the output of which are converted into direct current flowing into the DC bus. The gird will provide additional electricity to the whole system during periods of insufficient electricity inside the system. The grid can also be automatically selected to directly supply the load when emergencies occur in PV and ICEs. The energy storage ensemble (ESE) located between DC bus and AC bus is used to balance power supply and load demand between DERs, grid, battery, and the load. The model of the electrical part can be either operated in islanded mode or in grid-connected mode depending on the load condition.

In thermal part, part of the jacket water and exhaust heat from ICEs are utilized by heat exchanger (HE) and absorption refrigerator (AR) to provide the hot water and the cooling supply, respectively. The hot water tank is used to store the generated hot water and release it when there is an insufficiency of hot water supply. In case of capacity limit on heat exchanger, one gas boiler (GB) is added to provide enough hot water supply together with heat exchanger and hot water tank. Similarly, the thermal storage (TS) is used to store cold water generated from absorption refrigerator and release it when necessary. One absorption chiller for cooling (ACC) is also added in case of the capacity limit on absorption refrigerator, to provide enough cooling supply together with absorption refrigerator and thermal storage.

Figure 2:
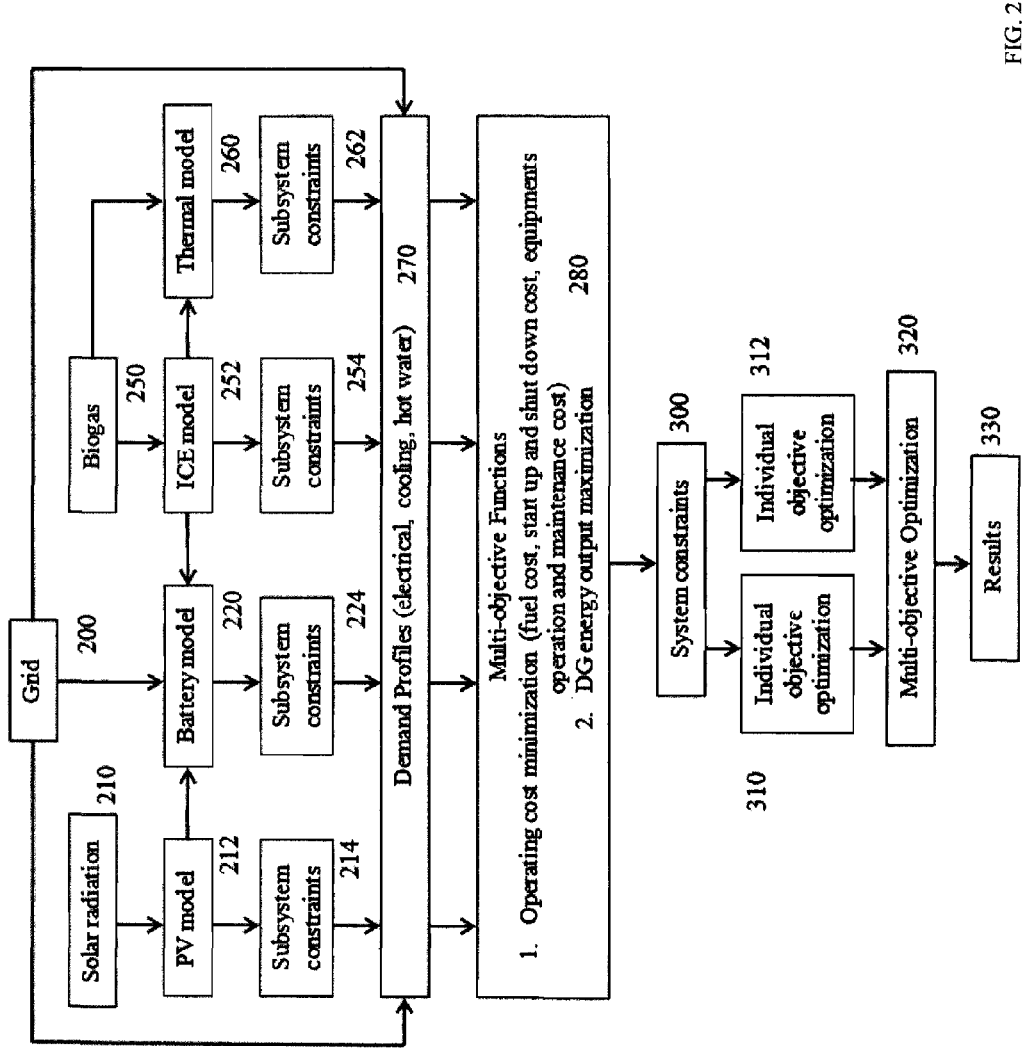
FIG. 2 shows an exemplary flow chart of a microgrid optimization model.

FIG. 2 shows an exemplary flow chart of a microgrid optimization model. A model of a grid 200 includes models for solar radiation 210, photovoltaic (PV) model 212, and PV constraints 214. Similarly, a battery model 200 and battery constraints 224 are captured. The model also includes biogas 250 with an internal combustion engine (ICE) model 252 and constraints 254. The ICE model 252 communicates with a thermal model 260 and thermal constraint 262.

The model components 210-262 are provided to demand profiles 270 such as electrical, cooling, hot water profiles, among others. The information is provided to a multi-objective function optimizer 280. The optimizer 280 minimizes operating costs while maximizing energy output. This is subject to system constraints 300. The system can perform individual objective minimization 310-312, and then performs a multi-objective optimization 320 to generate results 330.

A combined cooling, heating, and power (CCHP) microgrid model can be used to improve system efficiency of energy utilization and lessen environmental problems caused by animal wastes based on multi-objective optimization. In this proposed model, the animal manure is used to produce biogas, which is used to feed internal combustion engines (ICEs), gas boilers, and absorption chillers. The generated electricity would offset that would otherwise be bought from main grids. PV generation is introduced to further increase the renewable fraction of energy contents. The electrical storage is also included to balance power demand and power supply. To increase system efficiency of energy utilization, coolant water from ICEs, plus their exhaust, could be utilized based on the thermal storage modeled, by inclusion of absorption refrigerator and heat exchanger. The final goal is to maximize energy output from distributed energy resources (DERs) and meanwhile minimize daily system operating cost. Extra electricity generated beyond the load demand could be used to charge battery storage. In this way, system energy cost is reduced with energy system improvement and reconfiguration, and surrounding environmental problems due to animal wastes are also lessened.

In one implementation, a rural dairy farm was selected as the test bed. The microgrid system infrastructure was introduced first. Then, the modeling of individual main component concerned of the microgrid system is done. Next, the multi-objective optimization method is deployed as describe in details below.

First, a biogas-fired ICE model is detailed. The fuel consumption rate of biogas-fueled ICE is expressed as a quadratic function of real power:

$$F_{g,t} = a_g + b_g P_{g,t} + c_g P_{g,t}^2 \tag{1}$$

where $P_{g,t}$ is the generator g output in kW at time t, $a_g$, $b_g$, $c_g$ are coefficients that can be calculated, respectively, from the data sheet provided by the manufacturer.

The total fuel consumption rate $F_t$ is shown as follows:

$$F_t = \sum_{g=1}^{M} (a_g + b_g P_{g,t} + c_g P_{g,t}^2) \tag{2}$$

The ICE units are first constrained by their capacities:

$$P_g^- u_{g,t} < P_{g,t} < P_g^+ u_{g,t}, \forall g \in M \tag{3}$$

where $P_g^{+,-}$ are the generator capacity's lower bound and upper bound, $u_{g,t}$ is binary variable indicating the state of generator g in time t (0 is off and 1 is on), M is the total number of generators.

The ICE units are constrained by minimum up and down time constraints:

$$u_{g,s} \geq u_{g,t} - u_{g,t-1}, \forall g, s \in \{t+1, \ldots t+UT_g-1\} \tag{4}$$

$$1 - u_{g,s} \geq u_{g,t-1} - u_{g,t}, \forall g, s \in \{t+1, \ldots t+DT_g-1\} \tag{5}$$

where s is the time period, $UT_g$ is the minimum up time of generator g in hours, $DT_g$ is the minimum down time of generator g in hours.

Ramp rate constraints are also considered for ICE units, which can restrict generators' output between two consecutive periods due to their physical limitations, also including start up and shut down periods:

$$P_{g,t} - P_{g,t-1} \leq R_g^+ u_{g,t-1} + R_g^{SU}(1 - u_{g,t-1}), \forall g, t \tag{6}$$

$$P_{g,t-1} - P_{g,t} \leq R_g^- u_{g,t} + R_g^{SD}(1 - u_{g,t}), \forall g, t \tag{7}$$

where $R_g^{+,-}$ are ramp up and ramp down constraints in kW when generator g is on, $R_g^{SU,SD}$ are start up and shut down constraints in kW when generator g starts up and shuts down.

Two other binary variables are used to represent start up and shut down states of ICEs, as shown in the following two equation:

$$v_{g,t} = u_{g,t} - u_{g,t-1}, \forall g, t \tag{8}$$

$$w_{g,t} = u_{g,t-1} - u_{g,t}, \forall g, t \tag{9}$$

where $v_{g,t}$ and $w_{g,t}$ are binary variables indicating start up and shut down state of ICEs.

Next, a PV model is detailed. The calculation of DC output power of PV modules $P_{PV,t}$ is shown as the following equation:

$$P_{PV,t} = \eta_{PV,t} A_{PV} G_{\beta,t} \tag{10}$$

The PV efficiency $\eta_{PV,t}$ in time t is shown in:

$$\eta_{PV,t} = \eta_r \eta_{pc}(1 - \beta(T_{c,t} - T_{ref})) \tag{11}$$

The PV cell temperature $T_c$ in ° C. in time t is given by:

$$T_{c,t} = T_a + \left(\frac{NOCT - 20}{800}\right) G_{\beta,t} \tag{12}$$

where $A_{PV}$ is the available total PV modules area in m², $G_{\beta,t}$ is incident solar radiation in Wh/m² in time t, $\eta_r$ is PV reference module efficiency, $\eta_{pc}$ is PV power conditioning efficiency, $\beta$ is PV efficiency temperature coefficient, $T_{ref}$ is PV reference temperature in ° C., $T_a$ is PV ambient temperature, NOCT is normal operating cell temperature in ° C.

A battery storage model is discussed next. The output power from DERs may be insufficient to supply the load; DERs and the main grid may fail to supply the load; and the supply from DERs may also exceed beyond the load demand. In these cases, the electrical battery storage is needed to balance the load demand and power supply, and store extra energy from DERs.

The hourly available capacity of the battery storage $P_{batt,t}$ in time t is calculated as the following:

$$P_{batt,t} = P_{batt,t-1} + E_{cha,t}\eta_{cha} - \frac{E_{dis,t}}{\eta_{dis}} \quad (13)$$

where $E_{cha,t}$ is hourly charging quantity flows into the battery storage in kWh in time t, $E_{dis,t}$ is hourly discharging quantity flows out of the battery storage in kWh in time t, $\eta_{cha}$ is charging efficiency of the battery storage, $\eta_{dis}$ is the discharging efficiency of the battery storage.

$$\sum_{g=1}^{M} P_{g,t} + P_{PV,t} + P_{grid,t} = P_{L,t} + E_{cha,t} - E_{dis,t} \quad (14)$$

where $P_{grid,t}$ the hourly energy from the main grid in kWh in time t, $P_{L,t}$ is the load demand in kW in time t.

$$\Delta P_t = E_{cha,t} - E_{dis,t} \quad (15)$$

The hourly charging or discharging quantity of the battery storage is constrained by the capacity of the battery storage $E_s$.

$$0 \leq E_{cha,t} \leq E_s \quad (16)$$

$$0 \leq E_{dis,t} \leq E_s \quad (17)$$

where $\Delta P_t$ is a free variable in kW, indicating the hourly charging or discharging quantity of the battery storage.

In any hour t, the battery storage is either in charging state ($E_{cha,t} \neq 0$, $E_{dis,t} = 0$) or in discharging state ($E_{cha,t} = 0$, $E_{dis,t} \neq 0$) or doesn't work ($E_{cha,t} = 0$, $E_{dis,t} = 0$).

$$E_{cha,t} \times E_{dis,t} = 0 \quad (18)$$

The charged quantity of the battery storage is subject to the following constraints:

$$SOC^- \times E_s \leq P_{batt,t} \leq SOC^+ \times E_s \quad (19)$$

where $SOC^{+,-}$ are the upper bound and the lower bound of state of charge for the battery storage.

CCHP Model

The water based thermal storage tank is used to provide space cooling while the hot water tank is used to provide the daily hot water consumption. The model of the thermal storage tank for cooling is shown as the following equation [13]:

$$Q_t^{out} - Q_t^{in} = C\rho V(T(t+1) - T(t))/\Delta t - \varepsilon C\rho V\Delta T \quad (20)$$

While for the hot water tank model, the two terms in the left-hand side of the above equation are reversed. In the above equation, $Q_t^{out}$ is the heat release in kWh, $Q_t^{in}$ is the heat storage in kWh, C is the specific heat coefficient of storage medium in kWh/kg-K, $\rho$ is the density of storage medium in kg/m³, V is the capacity of storage tank in m³, T is the average temperature in the tank in K, $\Delta t$ is the hourly time duration, $\varepsilon$ is the coefficient of waste heat from storage tank, and $\Delta T$ is the temperature range in the tank.

The constraints of thermal storage for space cooling and hot water tank are described by following equations:

$$Q_t^{cool} = COP_{AR}Q_{ICE1,t} + Q_{ACC,t} + Q_{hr1,t} \quad (21)$$
$$= Q_{AR,t} + Q_{ACC,t} + Q_{hr1,t}$$

$$Q_t^{colin} \leq Q_{AR,t} \quad (22)$$

$$Q_t^{colout} = Q_{hr1,t} \quad (23)$$

$$Q_t^{colout} \times Q_t^{colin} = 0 \quad (24)$$

$$Q_t^{hw} = COP_{HE}Q_{ICE2,t} + Q_{GB,t} + Q_{hr2,t} \quad (25)$$
$$= Q_{HE,t} + Q_{GB,t} + Q_{hr2,t}$$

$$Q_t^{hwin} \leq Q_{HE,t} \quad (26)$$

$$Q_t^{hwout} = Q_{hr2,t} \quad (27)$$

$$Q_t^{hwout} \times Q_t^{hwcolin} = 0 \quad (28)$$

$$Q_t^{hr} = \sum_{n=1}^{2} Q_n^{ICE} \quad (29)$$

$$Q_t^{wh} = Q_{ICE3,t} \quad (30)$$

$Q_t^{cool,hw}$ are space cooling demand and hot water demand in kW, $COP_{AR,HE}$ are the coefficient of performance for absorption refrigerator and heat exchanger, $Q_{ICE1,2,3}$ are heat recovered from ICEs for space cooling, hot water and waste heat not recovered in kW, $Q_{ACC,GB}$ are output from absorption chiller for cooling and gas boiler in kW, $Q_{AR,HE}$ are output from absorption refrigerator and heat exchanger in kW, $Q_{hr1,2}$ are heat released from thermal storage and hot water tank in kW, $Q_t^{wh}$ is the waste heat not recovered in kW, $Q_t^{colin,out}$ are heat recovered from ICEs flowing into and that flowing out of thermal storage in kW, $Q_t^{hwin,out}$ are heat recovered from ICEs flowing into and that flowing out of hot water tank in kW.

The system optimizes two objective functions in one embodiment:

A. Minimization of Operating Cost

The objective function of system operating cost (OC) in $, including biogas fuel cost (FC), ICEs start up and shut down cost (SSC), equipments operation and maintenance cost (OMC), and cost of electricity bought from the grid (EBC), are shown as the followings:

$$OC = FC + SSC + OMC + EBC \quad (31)$$

$$FC = \sum_{t=1}^{N} \Delta T(F_t + F_{GB,t} + F_{ACC,t})C_{Bio} \quad (32)$$

$$SSC = \sum_{t=1}^{N} \sum_{g=1}^{M} (v_{g,t}SU + w_{g,t}SD) \quad (33)$$

$$OMC = \sum_{t=1}^{N} \Delta T \qquad (34)$$

$$\left(OM_{ICE}\sum_{g=1}^{M} P_{g,t} + OM_{GB}P_{GB,t} + OM_{ACC}P_{ACC,t} + OM_{AR}P_{AR,t}\right)$$

$$EBC = \sum_{t=1}^{N} \Delta T(C_{GriE}P_{grid,t}) \qquad (35)$$

where $\Delta T$ is hourly time step, $C_{Bio}$ is the biogas cost in \$/L, $F_{t,GB,ACC}$ are fuel cost of ICEs, gas boiler, and absorption chiller for cooling in L/h, SU, SD are start up cost and shut down cost in \$, $0M_{ICE,GB,ACC,AR}$ are operation and maintenance cost of ICEs, GB, ACC, and AR in \$/kWh, $P_{GB,ACC,AR,t}$ are output of gas boiler, absorption chiller for cooling and absorption refrigerator in time t in kW, $C_{GriE}$ is electricity cost of the grid in \$/kWh, $P_{grid,t}$ is the power bought from the grid in kW.

B. Maximization of DG Output

The objective function of the total DG output $E_{DG}$ in kWh is given by the following equation:

$$E_{DG} = \sum_{t=1}^{N}\left(\sum_{g=1}^{M} P_g(t) + P_{PV}(t)\right)\Delta T \qquad (36)$$

C. System Constraints $$\sum_{g=1}^{M} P_{g,t} + P_{PV,t} + P_{grid,t} - P_{L,t} = \Delta P_t \qquad (37)$$

In one embodiment, a multi-objective optimization can be used to manage and find the best solution between different objectives. Since these objectives might be nonlinear, conflicting or incommensurable, the global optimal solution for the multi-objective optimization is generally achieved by Pareto optimality. The Pareto optimal solutions are best compromise or trade-off solutions between different objectives. A trade-off frontier between the objective of system operating cost minimization and the objective of DG output maximization would be found according to the preferences of the decision makers. However, the development of Pareto optimal solutions is significantly complicated when the number of objectives exceeds two, where normal boundary interaction (NBI) and $\epsilon$-constraint method are efficient algorithms to solve such problems. The whole system model is programmed and optimized in GAMS environment. Since it is mixed integer nonlinear programming, the BONMIN solver is selected to solve the optimization problem.

Based on MINLP, a CCHP model of a rural microgrid uses multi-objective optimization to improve system efficiency of energy utilization, reduce the daily operating cost, and lessen environmental problems caused by animal wastes. A variety of energy sources, such as ICEs, PV modules, battery, thermal storage, absorption refrigerator, absorption chiller, gas boiler, heat and exchanger are included in the microgrid model. Constraint functions are included in the optimization model to reflect some detailed as well as necessary considerations and thus make the results more accurate and close to reality. From the results, the multi-objective optimization on daily operating cost minimization and DG energy output maximization works very well based on the microgrid model presented, which can give optimal solutions to both the daily operating cost and the DG energy output.

Figure 3:
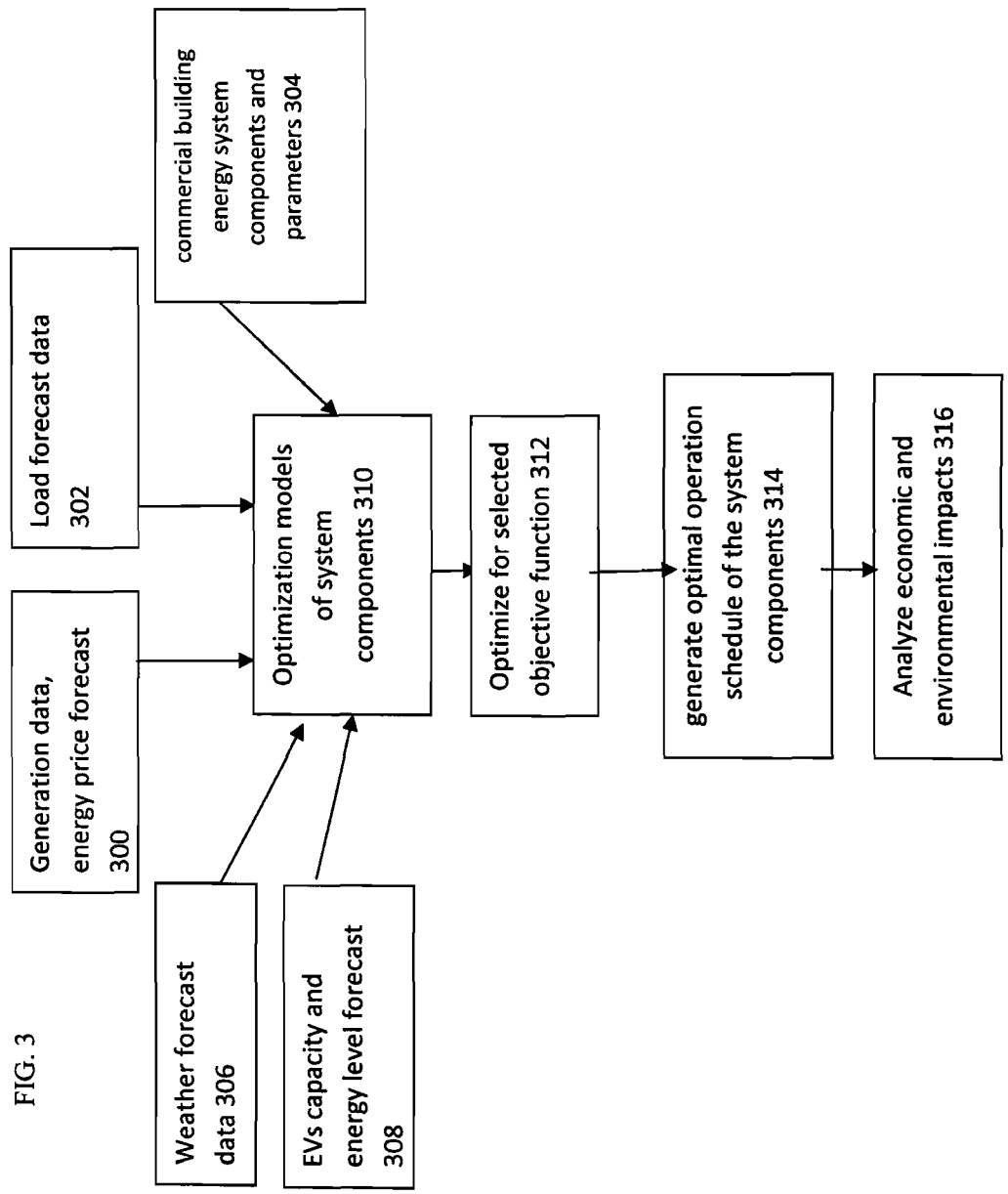
FIG. 3 shows an exemplary block diagram of a system to perform optimal operation scheduling of microgrids using multi-objective optimization.

FIG. 3 shows an exemplary system for optimizing economic and environmental impacts using EVs as mobile energy storage systems. Power generation data and energy price forecast are provided (300). Load forecast data is also input (302). The system also receives commercial building energy system components and parameters (304). Weather forecast data (306) is provided. EV capacity and energy level forecast are also received (308). With the input data, the system performs one or more optimization models of the system components (310). Next, the system optimizes for selected objective functions (312). An optimal generation schedule of system components is generated (314). The system then analyzes economic and environmental impacts (316).

In one implementation, mathematical models of microgrids' components include mathematical models of distributed energy resources and grid connections. In an implementation, the energy balance equation for ESS is given as follows:

$$e_{ess,t} = (1 - \varphi_{ess})e_{ess,t-1} + \tau\left(p_{ess,t}^{chg}\eta_{ess}^{chg} - \frac{p_{ess,t}^{dch}}{\eta_{ess}^{dch}}\right), \qquad (37)$$

where $e_{ess,t}$, $\phi_{ess}$, and $\tau$ represent energy storage level at time t, energy loss, and the time interval in hours, respectively. $p_{ess,t}^{chg}$, $\eta_{ess}^{chg}$, $p_{ess,t}^{dch}$, and $\eta_{ess}^{dch}$ stand for charging and discharging power and efficiencies of the ESS, respectively.

Stored energy within the ESS is limited by its minimum and maximum State Of Charge, $\underline{SOC}$ and $\overline{SOC}$, respectively, as follows:

$$\underline{SOC}_{ess}\overline{E}_{ess} \leq e_{ess,t} \leq \overline{SOC}_{ess}\overline{E}_{ess}, \qquad (38)$$

where $\overline{E}_{ess,t}$ denotes maximum capacity of the ESS.

The following constraints are considered to ensure that $p_{ess,t}^{chg}$ and $p_{ess,t}^{dch}$ are less than maximum charging and discharging power ratings of the ESS:

$$0 \leq p_{ess,t}^{chg} \leq u_{ess,t}^{chg}\overline{P}_{ess}, \qquad (39)$$

$$0 \leq p_{ess,t}^{dch} \leq u_{ess,t}^{dch}\overline{P}_{ess}, \qquad (40)$$

where, $u_{ess,t}^{chg}$ and $u_{ess,t}^{dch}$ are binary variables representing charging and discharging operation modes of the ESS.

The ESS should not operate in charging and discharging modes simultaneously; this is formulated as follows:

$$u_{ses,t}^{chg} + u_{ses,t}^{dch} \leq 1, \qquad (41)$$

Operational and maintenance costs of ESS which includes its degradation costs, is assumed to be proportional to the number of charging and discharging cycles, as follows:

$$c_{ess,t} = C_{ess}^{dg}1/2(v_{ess,t}^{chg} + v_{ess,t}^{dch}) + \tau C_{ess}^{om}\overline{E}_{ess,t}, \qquad (42)$$

where $C_{ess}^{om}$ denotes constant maintenance costs and $C_{ess}^{dg}$ represents degradation costs of the ESS per cycle which can be calculated based on the total number of charging and discharging cycles of the ESS from manufacturer data and its replacement costs. $v_{ess,t}^{chg}$ and $v_{ess,t}^{dch}$ represent start up flags for the charging and discharging modes, respectively, defined as follows:

$$v_{ess,t}^{chg} \geq u_{ess,t}^{chg} - u_{ess,t-1}^{chg}, \qquad (43)$$

$$v_{ess,t}^{dch} \geq u_{ess,t}^{dch} - u_{ess,t-1}^{dch}, \qquad (44)$$

where $v_{ess,t}^{chg}$ and $v_{ess,t}^{dch}$ represent start up flags for the charging and discharging modes, respectively.

In another embodiment, the minimum and maximum power and heat output characteristics of ICE units are modeled as follows:

$$\underline{P}_i u_{i,t} \leq p_{i,t} \leq \overline{P}_i u_{i,t}, \quad (145)$$

$$\underline{H}_i u_{i,t} \leq h_{i,t} \leq \overline{H}_i u_{i,t}, \quad (146)$$

where $p_{i,t}$, $h_{i,t}$, and $u_{i,t}$ denote power and heat generation and On/Off state of ICE i at time t, respectively. $\underline{P}_i$ and $\overline{P}_i$, and $\underline{H}_i$ and $\overline{H}_i$ represent upper and lower bounds of ICE's power and heat generation, respectively. In addition to these constraints, the operational region of these CHP units is limited by minimum and maximum Power to Hear Ratio (PHR), which is formulated as follows:

$$\underline{PHR}_i h_{i,t} \leq p_{i,t} \leq \overline{PHR}_i h_{i,t}, \quad (147)$$

Minimum up-time and down-time characteristics of ICEs are formulated using the following constraints:

$$v_{i,t} - w_{i,t} = u_{i,t} - u_{i,t-1}, \quad \forall t \in [2,T] \quad (148)$$

$$v_{i,t} + w_{i,t} \leq 1, \quad \forall t \in [2,T] \quad (14)$$

$$\sum_{s=t-UP_i+1}^{t} v_{i,s} \leq u_{i,t}, \quad \forall t \in [UP_i+1, T] \quad (149)$$

$$\sum_{s=t-DN_i+1}^{t} w_{i,s} \leq 1 - u_{g,t}, \quad \forall t \in [DN_i+1, T] \quad (150)$$

where $v_{i,t}$ and $w_{i,t}$ are binary variables indicating start-up and shutdown of ICEs, respectively, $UP_i$ is the minimum up time of device g in hours, and $DN_i$ is the minimum down time of device i in hours.

Ramp up and ramp down characteristics of ICEs, which limit their power output change, between two consecutive time intervals, are also modeled. Since these limits might be different for the startup conditions, the following constraints are formulated to properly capture these physical characteristics of ICEs:

$$p_{i,t} - p_{i,t-1} \leq \overline{R}_i u_{i,t-1} + R_j^{SU}(1 - u_{i,t-1}), \quad \forall t \in [2,T] \quad (51)$$

$$p_{i,t-1} - p_{i,t} \leq \underline{R}_i u_{i,t} + R_i^{SD}(1 - u_{i,t}), \quad \forall t \in [2,T] \quad (52)$$

where $\overline{R}_i$ and $\underline{R}_i$ denote ramp up and ramp down limits of ICEs, respectively, and $R_i^{SU}$ and $R_i^{SD}$ denote these limits during start up and shutdown times.

The presented mathematical models for load sharing of several Internal Combustion Engines (ICEs) in can be used. In practice, μG's load usually is shared between the operating units in proportion to their rated powers. This operational constraint is formulated using the following constraints:

$$\frac{p_{i,t}}{\overline{P}_i} \leq r + (1 - u_{i,t})M, \quad \forall i, t \quad (53)$$

$$\frac{p_{i,t}}{\overline{P}_i} \geq r + (u_{i,t} - 1)M, \quad \forall i, t \quad (54)$$

where r represents the per unit ratio of load sharing among the operating units, and M denotes a large positive number.

Operational costs of ICEs at each time interval are approximated as a linear expression including fixed costs, fuel consumption costs considering a constant efficiency coefficient, and start up and shut down costs, as follows:

$$c_{i,t} = \tau\left(A_i + B_i \frac{p_{i,t} + h_{i,t}}{\eta_i} + C_i^{om} p_{p,t}\right) + v_{i,t} C_i^{SU} + w_{i,t} C_i^{SD} \quad (55)$$

where $A_i$ and $B_i$ denote the fuel cost coefficients, $\eta_i$ and $C_i^m$ indicate overall efficiency and maintenance costs, and $C_i^{SU}$ and $C_i^{SD}$ represent start up and shut down costs of ICE units, respectively.

Equations (10) to (20), with different parameter settings can be used to model the operation of MTs. Operational costs of MTs is formulated as follows:

$$c_{m,t} = \tau\left(A_m + B_m \frac{p_{m,t} + h_{m,t}}{\eta_m} + C_m^{om} \overline{P}_m\right) + v_{m,t} C_m^{SU} \quad (56)$$

where m is the index representing MTs.

Operational costs of FCs are approximated as a linear expression including fuel consumption costs, startup costs and maintenance costs:

$$c_{f,t} = \tau\left(B_f \frac{p_{f,t} + h_{f,t}}{\eta_f} + C_f^{om} \overline{P}_f\right) + v_{f,t} C_f^{SU} + w_{f,t} C_f^{SD}, \quad (57)$$

where $\eta_f$, $C_f^{SU}$, $C_f^{SD}$, and $C_f^m$ denote overall efficiency, startup costs, shut down costs, and maintenance costs of FC f, respectively. Minimum and maximum power outputs, minimum up time and down time, ramp up and ramp down, and start up and shut down constraints of FCs are formulated similar to the ones for ICEs (i.e., (10)-(20)).

Energy balance equation for Thermal Energy Storages (TESs) including Heat Energy Storage (HES) and Cold Energy Storage (CES) is given as follows:

$$e_{tes,t} = (1 - \varphi_{tes})e_{tes,t-1} + \tau\left(h_{tes,t}^{in} \eta_{tes}^{in} - \frac{h_{tes,t}^{out}}{\eta_{tes}^{out}}\right) \quad (58)$$

where $h_{tes,t}^{in}$ and $h_{tes,t}^{out}$ denote amount of thermal energy injected to or extracted from the TES, respectively. Lower and upper bunds on thermal energy exchange of TES are modeled as follows:

$$\underline{H}_{tes} u_{tes,t}^{out} \leq h_{tes,t}^{out} \leq \overline{H}_{tes} u_{tes,t}^{out}, \quad (59)$$

$$\underline{H}_{tes} u_{tes,t}^{in} \leq h_{tes,t}^{in} \leq \overline{H}_{tes} u_{tes,t}^{in}, \quad (60)$$

$$u_{tes,t}^{in} + u_{tes,t}^{out} \leq 1, \quad (61)$$

$$\underline{TE}_{tes} \leq e_{tes,t} \leq \overline{TE}_{tes}, \quad (62)$$

where $\overline{H}_{tes}$, $\underline{H}_{tes}$, $\overline{TE}_{tes}$, and $\underline{TE}_{tes}$ denote upper and lower limits of heat exchange rate and thermal energy capacity of the TES, respectively.

Gas Boiler (GB) and Absorption Chiller for Cooling (ACC) are widely used in commercial buildings to supply heating and cooling demand, respectively, by burning natural gas. Their efficiency is measured by Coefficient of Performance (COP) which is defined as follows:

$$COP_i = \frac{h_i^{out}}{h_i^{in}} \tag{63}$$

where $h_i^{out}$ represents amount of desired output thermal energy (heat or cold for i=GB or i=ACC, respectively) and $h_i^{in}$ denotes input energy. Minimum and maximum heat output characteristics of these DER units are modeled as follows:

$$\underline{H}_i u_{i,t} \leq h_{i,t}^{out} \leq \overline{H}_i u_{i,t}, \tag{64}$$

Operational costs of these units are modeled using the following equation:

$$c_{i,t} = \tau \left( B_i \frac{h_{i,t}^{out}}{COP_i} + C_i^{om} \overline{H}_i \right) + v_{i,t} C_i^{SU} + w_{i,t} C_i^{SD}, \tag{65}$$

HE and ARs are examples of thermal energy exchangers that transfer heat between sources with different temperatures. Their efficiency is measured in terms of COP, and their minimum and maximum heat output characteristics can be modeled similar to (30). Operational costs of energy exchangers is formulated as follows:

$$c_{i,t} = \tau(u_{i,t} C_i^{om} + C_i^m \overline{H}_i), \tag{66}$$

DC/AC and AC/DC modes of the electricity converters can be modeled as follows:

$$p_{inv,t}^{AC} = \eta_{inv} p_{inv,t}^{DC} \tag{67}$$

$$p_{con,t}^{DC} = \eta_{con} p_{con,t}^{AC} \tag{68}$$

$$\underline{P}_{inv} u_{inv,t} \leq p_{inv,t}^{AC} \leq \overline{P}_{inv} u_{inv,t}, \tag{69}$$

$$\underline{P}_{con} u_{con,t} \leq p_{con,t}^{AC} \leq \overline{P}_{con} u_{con,t}, \tag{70}$$

where $\eta_{inv}$ and $\eta_{con}$ denote the conversion efficiency in inventor and converter modes, respectively. $u_{inv,t}$ and $u_{con,t}$ are binary variables denoting inverter (DC/AC) and converter (AC/DC) modes of operation, respectively. The converter should not operate in DC/AC and AC/DC modes simultaneously, which is modeled as follows:

$$u_{inv,t} + u_{con,t} \leq 1 \tag{71}$$

For grid connection modeling, a connection feeder has a transfer limit that is modeled as follows:

$$-\underline{P}_{Gr} \leq p_{Gr,t} \leq \overline{P}_{Gr} \tag{72}$$

where $p_{Gr,t}$ represents power trade between the µG and the grid (with a positive value for buying power from the grid and a negative value for selling to the grid), and $\overline{P}_{Gr}$ denotes the transfer limit of the feeder. By setting $\overline{P}_{Gr}$ and $\underline{P}_{Gr}$ to zero, the proposed model can be used to optimally operate the µG in the isolated mode.

Commercial building µGs energy costs include energy consumption costs and peak demand charges. Peak demand of the µG over the scheduling horizon is found using the following constraint:

$$p^{dc} \geq p_{Gr,t}, \tag{73}$$

where $p^{dc}$ represents the peak demand of the µG.

To have a certain degree of reliability in operation of a energy system, the system should be able to respond to unexpected changes. Providing spinning reserves is one way of improving energy system security and reliability. While various methods can be used to determine the amount of spinning reserve for an energy system, in this work, we assume that spinning reserves must be at least equal to 10% of µG's load. Therefore, spinning reserves constraint of the µG at each time interval is formulated as follows:

$$\Sigma_{i=1}^{N_i}(\overline{P}_i u_{i,t} - p_{i,t}) + \Sigma_{m=1}^{N_m}(\overline{P}_m u_{m,t} - p_{m,t}) + \Sigma_{f=1}^{N_f}(\overline{P}_f u_{f,t} - p_{f,t}) + p_{ess,t}^{sp} \geq 0.1 P_{D,t} \tag{74}$$

where $p_{ess,t}^{sp}$ represents the spinning reserve provided by ESS, calculated using the following formula:

$$p_{ess,t}^{sp} = \min\left\{ \frac{(e_{ess,t} - SOC_{ess} \tilde{E}_{ess})}{\tau}, \overline{P}_{ess} - p_{ess,t}^{dch} \right\} \tag{75}$$

This constraint is reformulated to linear constraints as follows:

$$p_{ess,t}^{sp} \leq \frac{(e_{ess,t} - SOC_{ess} \overline{E}_{ess})}{\tau} \tag{76}$$

$$p_{ess,t}^{sp} \leq \overline{P}_{ess} - p_{ess,t}^{dch} \tag{77}$$

MILP or MINLP optimization technique can be used for problem. Deterministic optimization approaches can be used to solve Problem. Single objective optimization can be used to solve the problem. Multi-objective optimization can be used to solve Problem. Stochastic optimization approach, Single Objective Stochastic optimization approach, or Multi-Objective Stochastic optimization approach can be used to solve the problem.

In one embodiment, mathematical models of the µG components are described in Section II, and the remaining constraints and the objective functions are presented next.

Constraints

In addition to the formulated models of commercial building pOs components, the constraints presented in this section should also be included in the model to properly represent the operation of these µGs.

Heat Balance

Heat demand-supply balance constraint is as follows:

$$\sum_{i=1}^{N_{GB}} h_{i,t}^{out} + \sum_{k=1}^{N_{HEX}} h_{k,t}^{out} + h_{hes,t}^{out} \eta_{hes}^{out} = \frac{h_{hes,t}^{in}}{\eta_{hes}^{in}} + H_{D,t}^{h} \tag{78}$$

where $N_{GB}$, $N_{HEX}$, and $H_{D,t}^{h}$ denote total numbers of GBs and Heat Exchangers (HEX), and gas heating demand of the building, respectively.

Cold demand-supply balance constraint is as follows:

$$\sum_{j=1}^{N_{ACC}} h_{j,t}^{out} + \sum_{k=1}^{N_{CEX}} h_{k,t}^{out} + h_{ces,t}^{out} \eta_{ces}^{out} = \frac{h_{ces,t}^{in}}{\eta_{ces}^{in}} + H_{D,t}^{c} \tag{479}$$

where $N_{ACC}$, $N_{CEX}$, and $H_{D,t}^{c}$ denote total numbers of ACCs and Cold Exchangers (CEX), and gas cooling demand of the building, respectively.

Heat balance equation for the heat exchangers which includes both heating and cooling parts is as follows:

$$\sum_{i=1}^{N_{ICE}} h_{i,t} + \sum_{f=1}^{N_{FC}} h_{f,t} + \sum_{m=1}^{N_{MT}} h_{m,t} = \sum_{k=1}^{N_{HEX}} \frac{h_{k,t}^{out}}{COP_k} + \sum_{k=1}^{N_{CEX}} \frac{h_{k,t}^{out}}{COP_k} \quad (80)$$

Power Balance

Power balance constraint of the AC systems is formulated as follows:

$$\Sigma_{i=1}^{NICE} p_{i,t} + \Sigma_{f=1}^{NFC} p_{f,t} + \Sigma_{m=1}^{NMT} p_{m,t} + p_{inv,t}^{AC} + p_{Gr,t} = p_{con,t}^{AC} + p_{D,t}^{AC} + p_{loss,t} \quad (81)$$

where $P_{D,t}^{AC}$ denotes AC demand of the μG at time t. This constraint states that total power supply from the ICEs, PV, FC, MT, inverter, and the grid at each time must be equal to, converter's AC power input, μG's AC demand, and losses of the AC system. Similarly, power balance constraint of the DC systems is formulated as follows:

$$P_{pv,t} + p_{ess,t}^{dch} + p_{con,t}^{DC} = p_{inv,t}^{DC} + p_{ess,t}^{chg} + p_{D,t}^{DC} \quad (82)$$

Objective Functions

Minimization of Daily Energy Costs

Daily total energy costs of the μG is formulated as follows:

$$\min \Sigma_{t=1}^{T} \tau[p_{Gr,t} C_{Gr,t}^{s}] + (p^{dc} C_{Gr,t}^{dc} + \Sigma_{t=1}^{T} [\Sigma_{i=1}^{NICE} C_{i,t} + \Sigma_{m=1}^{NMT} C_{m,t} + \Sigma_{f=1}^{NFC} C_{f,t} + \Sigma_{i=1}^{NGB} C_{i,t} + \Sigma_{j=1}^{NACC} C_{j,t} + C_{pv}^{om} + C_{tes}^{om} + \Sigma_{i=1}^{NHEX} C_{i,t} + \Sigma_{i=1}^{NCEX} C_{i,t} + c_{ess,t}]) \quad (83)$$

where $C_{Gr,t}^{s}$ and $C_{Gr}^{dc}$ denote electricity price and demand charges of the grid, respectively.

Minimization of GHG Emissions

Minimization of GHG emissions of the μG is formulated as follows:

min (84)

$$\sum_{t=1}^{T} \tau \left[ \sum_{i=1}^{N_{ice}} \varepsilon_i^{GHG} \frac{p_{i,t}}{\eta_i} + \sum_{m=1}^{N_{MT}} \varepsilon_m^{GHG} \frac{p_{m,t} + h_{m,t}}{\eta_m} + \sum_{f=1}^{N_{FC}} \varepsilon_f^{GHG} \frac{p_{f,t} + h_{f,t}}{\eta_f} + \sum_{i=1}^{N_{GB}} \varepsilon_i^{GHG} \frac{h_{i,t}^{out}}{COP_i} + \sum_{j=1}^{N_{ACC}} \varepsilon_i^{GHG} \frac{h_{j,t}^{out}}{COP_j} + \varepsilon_{Gr,t}^{GHG} p_{Gr,t} \right]$$

where $\varepsilon_i^{GHG}$ and $\varepsilon_{Gr,t}^{GHG}$ denote GHG emissions rate of DER i and marginal GHG emissions of the grid at time t, respectively.

Multi-objective optimization is used to manage and find the best solutions between different, usually conflicting, objective functions. The best solutions for the multi-objective optimization is generally achieved by Pareto optimality, where the Pareto optimal solutions are the best compromise or trade-off solutions between different objectives [9]. In this method, a trade-off frontier between maximization of daily profit and minimization of GHG emissions would be found according to the preferences of system operator.

The above system provides better formulation of physical models of commercial building energy system components that is easier to solve for real-time applications. More accurate modeling of operational requirements of each component are done. More accurate modeling of operational requirements of commercial building energy system can be done. The optimization formulation of the Problem will result in lower operational costs and emissions in microgrids.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 4:
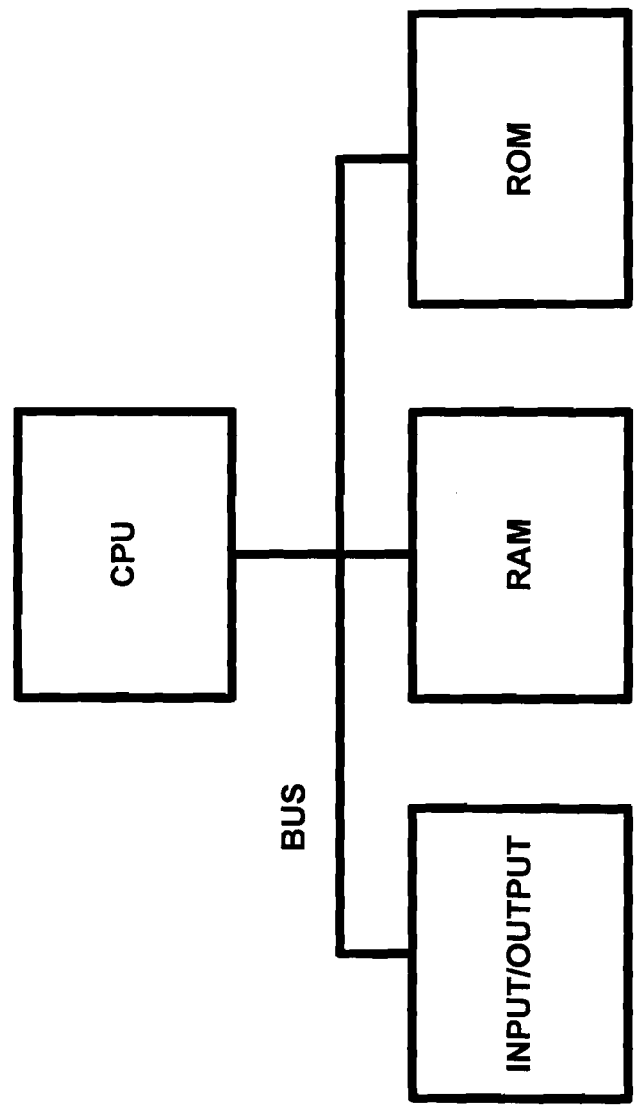
FIG. 4 shows an exemplary computer system to improve energy efficiency of a farm with livestock wastes.

By way of example, a block diagram of a computer to support the system is discussed next in FIG. 4. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to manage energy efficiency of a microgrid, comprising:
   generating a comprehensive cooling, heating, and power (CCHP) microgrid model;
   generating a model for converting organic waste to energy;
   performing on a computer multi-objective optimization to manage system efficiency of energy utilization and reduce environmental problems caused by organic wastes and to optimize microgrid operation;
   displaying results of the optimization for review;
   modeling distributed energy resources and grid connections; and
   modeling energy storage systems (ESS) as follows:

$$e_{ess,t} = (1 - \varphi_{ess})e_{ess,t-1} + \tau \left( p_{ess,t}^{chg} \eta_{ess}^{chg} - \frac{p_{ess,t}^{dch}}{\eta_{ess}^{dch}} \right),$$

where $e_{ess,t}$, $\phi_{ess}$, and $\tau$ represent energy storage level at time t, energy loss, and the time interval in hours, respectively and $p_{ess,t}^{chg}$, $\eta_{ess}^{chg}$, $p_{ess,t}^{dch}$, and $\eta_{ess}^{dch}$ represent charging and discharging power and efficiencies of the ESS, respectively;

wherein modeling operational and maintenance costs of ESS includes its degradation costs is assumed to be proportional to the number of charging and discharging cycles, as follows:

$$C_{ess,t} = C_{ess}^{dg} 1/2 (v_{ess,t}^{chg} + v_{ess,t}^{dch}) + \tau C_{ess}^{om} \overline{E}_{ess,t},$$

where $C_{ess}^{om}$ denotes constant maintenance costs and $C_{ess}^{dg}$ represents degradation costs of the ESS per cycle which can be calculated based on the total number of charging and discharging cycles of the ESS from manufacturer data and its replacement costs, $v_{ess,t}^{chg}$ and $v_{ess,t}^{dch}$ represent start up flags for the charging and discharging modes, respectively, defined as follows:

$$v_{ess,t}^{chg} \geq u_{ess,t}^{chg} - u_{ess,t-1}^{chg},$$

$$v_{ess,t}^{dch} \geq u_{ess,t}^{dch} - u_{ess,t-1}^{dch},$$

where $v_{ess,t}^{chg}$ and $v_{ess,t}^{dch}$ represent start up flaps for the charging and discharging modes, respectively.

2. The method of claim 1, comprising modeling stored energy within the ESS as limited by minimum and maximum State Of Charge, $\underline{SOC}$ and $\overline{SOC}$, respectively, as follows:

$$\underline{SOC}_{ess} \overline{E}_{ess,t} \leq e_{ess,t} \leq \overline{SOC}_{ess} \overline{E}_{ess},$$

where $\overline{E}_{ess,t}$ denotes maximum capacity of the ESS.

3. The method of claim 1, comprising modeling constraints where $P_{ess,t}^{chg}$ and $p_{ess,t}^{dch}$ are less than maximum charging and discharging power ratings of the ESS:

$$0 \leq p_{ess,t}^{chg} \leq u_{ess,t}^{chg} \overline{P}_{ess}$$

$$0 \leq p_{ess,t}^{dch} \leq u_{ess,t}^{dch} \overline{P}_{ess}$$

where, $u_{ess,t}^{chg}$ and $u_{ess,t}^{dch}$ are binary variables representing charging and discharging operation modes of the ESS.

4. The method of claim 1, wherein the ESS is inoperative in charging and discharging modes simultaneously as follows:

$$u_{ses,t}^{chg} + u_{ses,t}^{dch} \leq 1.$$

5. The method of claim 1, comprising modeling one or more Internal Combustion Engines (ICEs).

6. The method of claim 1, comprising modeling minimum and maximum power and heat output characteristics of Internal Combustion Engine (ICE) units are modeled as follows:

$$\underline{P}_i u_{i,t} < p_{i,t} < \overline{P}_i u_{i,t},$$

$$\underline{H}_i u_{i,t} < h_{i,t} < \overline{H}_i u_{i,t},$$

where $p_{i,t}$, $h_{i,t}$, and $u_{i,t}$ denote power and heat generation and On/Off state of ICE i at time t, respectively, $\underline{P}_i$ and $\overline{P}_i$, and $\underline{H}_i$ and $\overline{H}_i$ represent upper and lower bounds of ICE's power and heat generation, respectively, wherein an operational region of the CHP units is limited by minimum and maximum Power to Hear Ratio (PHR), which is formulated as follows:

$$\underline{PHR}_i h_{i,t} < p_{i,t} < \overline{PHR}_i h_{i,t}.$$

7. The method of claim 1, comprising modeling minimum up-time and down-time characteristics of ICEs are formulated with constraints:

$$v_{i,t} - w_{i,t} = u_{i,t} - u_{i,t-1}, \forall t \in [2,T]$$

$$v_{i,t} + w_{i,t} \leq 1, \forall t \in [2,T]$$

$$\Sigma_{s=t-UP_i+1}^{t} v_{i,s} \leq u_{i,t}, \forall t \in [UP_i+1,T]$$

$$\Sigma_{s=t-DN_i+1}^{t} w_{i,s} \leq 1 - u_{g,t}, \forall t \in [DN_i+1,T]$$

where $v_{i,t}$ and $w_{i,t}$ are binary variables indicating start-up and shutdown of ICEs, respectively, $UP_i$ is the minimum up time of device g in hours, and $DN_i$ is the minimum down time of device i in hours.

8. The method of claim 1, comprising modeling ramp up and ramp down characteristics of ICEs, which limit their power output change between two consecutive time intervals with constraints:

$$p_{i,t} - p_{i,t-1} \leq \overline{R}_i u_{i,t-1} + R_i^{SU}(1 - u_{i,t-1}), \forall t \in [2,T]$$

$$p_{i,t-1} - p_{i,t} \leq \underline{R}_i u_{i,t} + R_i^{SD}(1 - u_{i,t}), \forall t \in [2,T]$$

where $\overline{R}_i$ and $\underline{R}_i$ denote ramp up and ramp down limits of ICEs, respectively, and $R_i^{SU}$ and $R_i^{SD}$ denote these limits during start up and shutdown times.

9. The method of claim 1, comprising modeling load sharing of a plurality of Internal Combustion Engines (ICEs).

10. The method of claim 1, comprising modeling load in proportion to rated power with following constraints:

$$\frac{p_{i,t}}{\overline{P}_i} \leq r + (1 - u_{i,t})M, \forall i, t$$

$$\frac{p_{i,t}}{\overline{P}_i} \geq r + (u_{i,t} - 1)M, \forall i, t$$

where r represents the per unit ratio of load sharing among the operating units, and M denotes a large positive number.

11. The method of claim 1, comprising modeling operational and maintenance costs model of ICEs.

12. The method of claim 1, comprising modeling Operational costs of ICEs at each time interval are approximated as a linear expression including fixed costs, fuel consumption costs considering a constant efficiency coefficient, and start up and shut down costs, as follows:

$$c_{i,t} = \tau \left( A_i + B_i \frac{p_{i,t} + h_{i,t}}{\eta_i} + C_i^{om} \overline{P}_{p,t} \right) + v_{i,t} C_i^{SU} + w_{i,t} C_i^{SD}$$

where $A_i$ and $B_i$ denote the fuel cost coefficients, $\eta_i$ and $C_i^m$ indicate overall efficiency and maintenance costs, and $C_i^{SU}$ and $C_i^{SD}$ represent start up and shut down costs of ICE units, respectively.

13. The method of claim 1, comprising modeling micro turbines (MTs) operational costs as follows:

$$c_{m,t} = \tau \left( A_m + B_m \frac{p_{m,t} + h_{m,t}}{\eta_m} + C_m^{com} \overline{P}_m \right) + v_{m,t} C_m^{SU}$$

where m is the index representing MTs.

14. The method of claim 1, comprising modeling Fuel Cells (FCs) operational costs as a linear expression including fuel consumption costs, startup costs and maintenance costs:

$$C_{f,t} = \tau \left( B_f \frac{p_{f,t} + h_{f,t}}{\eta_f} + C_f^{om} \overline{P}_f \right) + v_{f,t} C_f^{SU} + w_{f,t} C_f^{SD},$$

where $\eta_f$, $C_f^{SU}$, $C_f^{SD}$, and $C_f^m$ denote overall efficiency, startup costs, shut down costs, and maintenance costs of FC f, respectively.

15. The method of claim 1, comprising modeling thermal energy storage (TESs) including Heat Energy Storage (HES) and Cold Energy Storage (CES) is given as follows:

$$e_{tes,t} = (1 - \varphi_{tes})e_{tes,t-1} + \tau\left(h_{tes,t}^{in}\eta_{tes}^{in} - \frac{h_{tes,t}^{out}}{\eta_{tes}^{out}}\right)$$

where $h_{tes,t}^{in}$ and $h_{tes,t}^{out}$ denote amount of thermal energy injected to or extracted from the TES, respectively, lower and upper bunds on thermal energy exchange of TES are modeled as follows:

$$\underline{H}_{tes}u_{tes,t}^{out} < h_{tes,t}^{out} < \overline{H}_{tes}u_{tes,t}^{out},$$

$$\underline{H}_{tes}u_{tes,t}^{in} < h_{tes,t}^{in} < \overline{H}_{tes}u_{tes,t}^{in},$$

$$u_{tes,t}^{in} + u_{tes,t}^{out} \leq 1,$$

$$\underline{TE}_{tes} < e_{tes,t} < \overline{TE}_{tes},$$

where $\overline{H}_{tes}$, $\underline{H}_{tes}$, $\overline{TE}_{tes}$, and $\underline{TE}_{tes}$ denote upper and lower limits of heat exchange rate and thermal energy capacity of the TES, respectively.

16. The method of claim 1, comprising modeling Gas Boiler (GB) and Absorption Chiller for Cooling (ACC) efficiency using a Coefficient of Performance (COP) defined as follows:

$$COP_i = \frac{h_i^{out}}{h_i^{in}}$$

where $h_i^{out}$ represents amount of desired output thermal energy (heat or cold for i=GB or i=ACC, respectively) and $h_i^{in}$ denotes input energy and wherein minimum and maximum heat output characteristics of the DER units are modeled as follows:

$$\underline{H}_j u_{i,t} < h_{i,t}^{out} < \overline{H}_i u_{i,t},$$

and operational costs of the DER units are modeled using the following equation:

$$c_{i,t} = \tau\left(B_i \frac{h_{i,t}^{out}}{COP_i} + C_i^{om}\overline{H}_i\right) + v_{i,t}C_i^{SU} + w_{i,t}C_i^{SD}.$$

17. The method of claim 1, comprising modeling Heat Exchangers (HE) and absorption refrigerator (AR).

18. The method of claim 1, comprising modeling converters as follows:

$$p_{inv,t}^{AC} = \eta_{inv}p_{inv,t}^{DC}$$

$$p_{con,t}^{DC} = \eta_{con}p_{con,t}^{AC}$$

$$\underline{P}_{inv}u_{inv,t} < p_{inv,t}^{AC} < \overline{P}_{inv}u_{inv,t},$$

$$\underline{P}_{con}u_{con,t} < p_{con,t}^{AC} < \overline{P}_{con}u_{con,t},$$

where $\eta_{inv}$ and $\eta_{con}$ denote the conversion efficiency in inventor and converter modes, respectively, $u_{inv,t}$ and $u_{con,t}$ are binary variables denoting inverter (DC/AC) and converter (AC/DC) modes of operation, respectively, the converter should not operate in DC/AC and AC/DC modes simultaneously, which is modeled as follows:

$$u_{inv,t} + u_{con,t} \leq 1.$$

19. The method of claim 1, comprising modeling minimization of GHG emissions of a microgrid as follows:

$$\min \sum_{t=1}^{T} \tau \left[ \sum_{i=1}^{N_{ICE}} \varepsilon_i^{GHG} \frac{p_{i,t}}{\eta_i} + \sum_{m=1}^{N_{MT}} \varepsilon_m^{GHG} \frac{p_{m,t} + h_{m,t}}{\eta_m} + \sum_{f=1}^{N_{FC}} \varepsilon_f^{GHG} \frac{p_{f,t} + h_{f,t}}{\eta_f} + \right.$$

$$\left. \sum_{i=1}^{N_{GB}} \varepsilon_i^{GHG} \frac{h_{i,t}^{out}}{COP_i} + \sum_{j=1}^{N_{ACC}} \varepsilon_i^{GHG} \frac{h_{j,t}^{out}}{COP_j} + \varepsilon_{Gr,t}^{GHG} p_{Gr,t} \right]$$

$$\min \sum_{t=1}^{T} \tau \left[ \sum_{i=1}^{N_{ICE}} \varepsilon_i^{GHG} \frac{p_{i,t}}{\eta_i} + \sum_{m=1}^{N_{MT}} \varepsilon_m^{GHG} \frac{p_{m,t} + h_{m,t}}{\eta_m} + \sum_{f=1}^{N_{FC}} \varepsilon_f^{GHG} \frac{p_{f,t} + h_{f,t}}{\eta_f} + \right.$$

$$\left. \sum_{i=1}^{N_{GB}} \varepsilon_i^{GHG} \frac{h_{i,t}^{out}}{COP_i} + \sum_{j=1}^{N_{ACC}} \varepsilon_i^{GHG} \frac{h_{j,t}^{out}}{COP_j} + \varepsilon_{Gr,t}^{GHG} p_{Gr,t} \right]$$

where $\epsilon_i^{GHG}$ and $\epsilon_{Gr,t}^{GHG}$ denote GHG emissions rate of DER i and marginal GHG emissions of the grid at time t, respectively.

* * * * *